US009951901B2

United States Patent
Shin

(10) Patent No.: US 9,951,901 B2
(45) Date of Patent: Apr. 24, 2018

(54) METHOD FOR RAPIDLY FREEZING PIPE

(71) Applicant: Ikho Shin, Youngin (KR)

(72) Inventor: Ikho Shin, Youngin (KR)

( * ) Notice: Subject to any disclaimer, the term of this patent is extended or adjusted under 35 U.S.C. 154(b) by 10 days.

(21) Appl. No.: 14/787,736

(22) PCT Filed: Apr. 30, 2013

(86) PCT No.: PCT/KR2013/003725
§ 371 (c)(1),
(2) Date: Oct. 28, 2015

(87) PCT Pub. No.: WO2014/178452
PCT Pub. Date: Nov. 6, 2014

(65) Prior Publication Data
US 2016/0102798 A1 Apr. 14, 2016

(30) Foreign Application Priority Data
Apr. 29, 2013 (KR) .......... 10-2013-0047648

(51) Int. Cl.
F25C 1/00 (2006.01)
F16L 55/103 (2006.01)
F16K 49/00 (2006.01)

(52) U.S. Cl.
CPC ............ *F16L 55/103* (2013.01); *F16K 49/00* (2013.01)

(58) Field of Classification Search
CPC .................................. F25C 1/00; F25C 5/005
USPC ..................................................... 62/66, 293
See application file for complete search history.

(56) References Cited

U.S. PATENT DOCUMENTS

| | | | | |
|---|---|---|---|---|
| 1,684,672 A | * | 9/1928 | Hill | ............ B60H 1/18 165/154 |
| 3,553,976 A | * | 1/1971 | Cumine et al. | ......... F25D 3/107 165/169 |
| 4,309,875 A | | 1/1982 | Radichio | |

FOREIGN PATENT DOCUMENTS

| | | |
|---|---|---|
| EP | 0 756 129 A2 | 1/1997 |
| KR | 10-2008-0107297 A | 12/2008 |
| KR | 10-1028963 B1 | 4/2011 |
| KR | 10-2012-0132015 A | 12/2012 |

(Continued)

OTHER PUBLICATIONS

International Search Report dated Jan. 22, 2014 issued in Application No. PCT/KR2013/003725 (with English translation).

*Primary Examiner* — Melvin Jones
(74) *Attorney, Agent, or Firm* — KED & Associates, LLP

(57) ABSTRACT

A rapid pipe freezing method including a process of wrapping the pipe with a cooling coil along the outer circumference surface of the pipe rapidly is disclosed. The method includes bending the cooling coil not to be blocked by itself so that a refrigerant flow through the inside thereof and arranging the cooling coil to form a freezing area, fixing the cooling coil to fix the cooling coil on one surface of the cover sheet such that at least one part of the freezing area may be overlapped with the cover sheet, installing the cover sheet wrapping the outer circumference surface of the pipe with the cover sheet such that the cooling coil of the freezing area may face the outer circumference surface of the pipe, and flowing a refrigerant by connecting a refrigerant cooling device to the one end of the cooling coil and the other end of the same and flowing a refrigerant through the inside of the cooling coil to freeze the inside of the pipe where the freezing area is overlapped.

5 Claims, 3 Drawing Sheets

(56) References Cited

FOREIGN PATENT DOCUMENTS

WO      WO 91/21955 A1    9/1994

* cited by examiner

METHOD FOR RAPIDLY FREEZING PIPE

CROSS-REFERENCE TO RELATED PATENT APPLICATIONS

This application is a U.S. National Stage Application under 35 U.S.C. § 371 of PCT Application No. PCT/KR2013/003725, filed Apr. 30, 2013, which claims priority to Korean Patent Application No. 10-2013-0047648, filed Apr. 29, 2013, whose entire disclosures are hereby incorporated by reference.

TECHNICAL FIELD

Example embodiments of inventive concepts relate to a method for freezing a pipe rapidly which prevents water leak by freezing the proper area of the pipe in case of repairing or replacing the pipe undergone leakage or damage, when leakage or damage has been occurred in the pipe of water supply, gray water, sewerage, power plant, and etc.

BACKGROUND ART

System facilities in factories with power plants or water supply of homes and schools include pipes for flowing system water. The front end and the rear end of a pipe is required to be frozen when a system facility undergoes water leakage or damage therein and needs to be fixed, or needs to be checked up, which may be performed in case that water may not be drained from the system facility or the pipe may not be isolated.

FIG. 1 illustrates the device for freezing a pipe rapidly disclosed in Korean Publication No. 2008-0107297. Referring to FIG. 1, sealing tightly by winding cooling coils 23 on two parts of the outside of the water supply pipe 30 to be cut and then applying a coil jacket 26 to the cooling coils 23. After then, the cooling coils 23 are connected to a refrigerant freezing device (not shown).

The refrigerant cooled and discharged from the refrigerant freezing device (not shown) is provided with the cooling coils 23 in the state of liquid, and the liquid refrigerant turns into gas in the cooling coils 23 to be recollected to the refrigerant freezing device through a connecting tube 24. According to the cooling process, the inside of the sealed coil jacket 26 is frozen rapidly such that water inside the applied water supply 30 may be frozen rapidly.

However, the pipe freezing device of FIG. 1 has difficulty of the cooling coils 23 being wound on the outer circumference surface which is cylindrical closely pressing. Conventionally, the cooling coils 23 may be metal tubes such as copper tubes of excellent heat transfer coefficient and may be bended to be installed in the field. It is very difficult to assume the outer circumference surface of the cylindrical pipe 30 exactly, so it is difficult to bend the coils accordingly and also takes much time. Accordingly, time and energy waste until pipe freezing occur because of degenerated thermal efficiency, resulting time and cost for pipe checkup being increased.

DETAILED DESCRIPTION OF THE INVENTION

Technical Goal of the Invention

According to an exemplary embodiment, the inventive concept provides a rapid pipe freezing method including winding a cooling coil along the outer circumference surface rapidly.

The method also includes bending the cooling coil so as to be pressed to the outer circumference surface at the most and winding the same along the outer circumference surface.

Technical Solution of the Invention

According to an exemplary embodiment of the inventive concept, a rapid pipe freezing method may include bending the cooling coil not to be blocked by itself so that a refrigerant flow through the inside thereof and arranging the cooling coil to form a freezing area, fixing the cooling coil to fix the cooling coil on one surface of the cover sheet such that at least one part of the freezing area may be overlapped with the cover sheet, installing the cover sheet wrapping the outer circumference surface of the pipe with the cover sheet such that the cooling coil of the freezing area may face the outer circumference surface of the pipe, and flowing a refrigerant by connecting a refrigerant cooling device to the one end of the cooling coil and the other end of the same and flowing a refrigerant through the inside of the cooling coil to freeze the inside of the pipe where the freezing area is overlapped.

The installing a cover sheet may include connecting one end of the cover sheet and the other end of the cover sheet such that the cooling coil may be pressed to the outer circumference surface of the pipe.

The one end of the cover sheet and the other end of the cover sheet may include a male Velcro pad and a female Velcro pad respectively so as to be attached and detached with each other.

The method may further include removing the cover sheet by taking off the cover sheet from the cooling coil still attached to the outer circumference surface and installing a coil fixing unit wrapping the cooling coil to press and fix the cooling coil to the pipe between the installing a cover sheet and the flowing a refrigerant.

The coil fixing unit may be a string or a metal wire.

The cover sheet and the cooling coil may be adhere with each other with both-sided adhesive tape in the fixing the cooling coil.

Effect of the Invention

According to the inventive concept, a cooling coil may be wound along the outer circumference surface of a pipe in the field that a pipe is required to be fixed or replaced, which results no expensive specialized device to be required. Also, the cooling coil may be bended to be pressed to the outer circumference surface at the most and wound along the surface. As a result, freezing thermal efficiency on the pipe may be increased to shorten operating time, thereby reducing time and cost for pipe maintenance.

BEST MODE FOR CARRYING OUT THE INVENTION

Various example embodiments will be described more fully hereinafter with reference to the accompanying drawings. The terminology used herein is for the purpose of describing particular example embodiments and may be varies according to the user's purpose or conventional custom in the art. Accordingly, definition of the terminology should be interpreted as having a meaning that is consistent with their meaning in the context of the relevant art.

Figure 1:
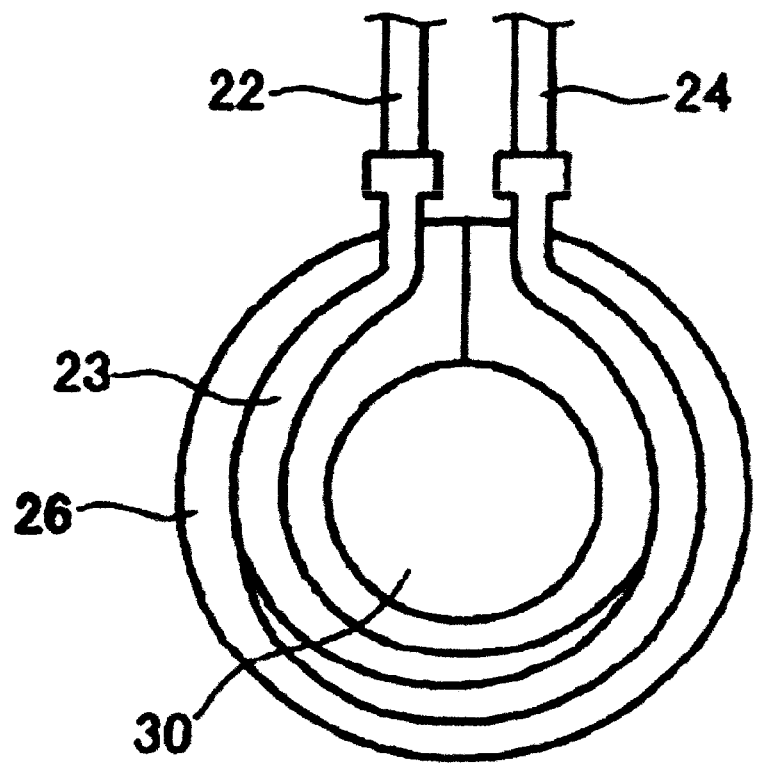
FIG. 1 is a cross-sectional view of a conventional pipe freezing device.
Figure 2:
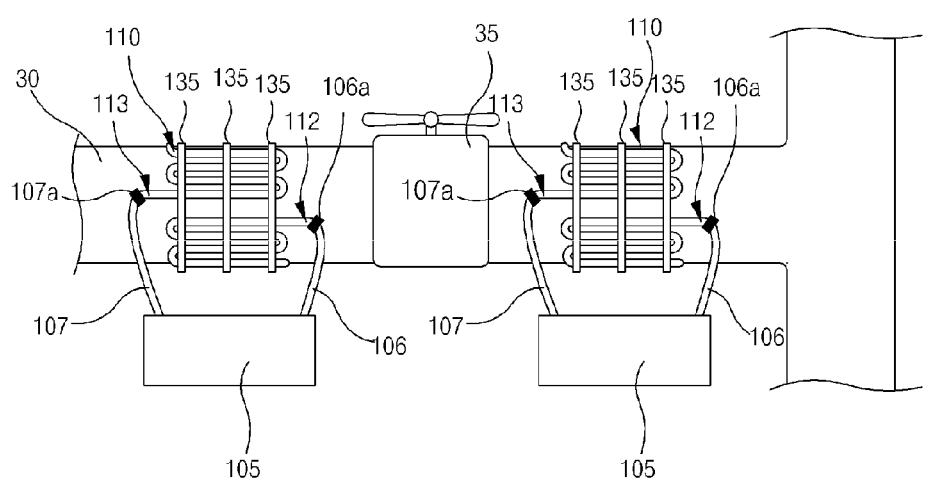
FIG. 2 is a block diagram illustrating a pipe freezing system applying a rapid pipe freezing method according to an exemplary embodiment of the present inventive concept.

FIG. 2 is a block diagram of a pipe freezing system applying a rapid pipe freezing method according to an exemplary embodiment of the present inventive concept. Referring to FIG. 2, the pipe freezing system 100 makes possible to maintain a system facility simply and cheaply by freezing system water in the demand part of a pipe 30 selectively, when a part of the pipe 30 guiding system water in water supply of power plants, factories, homes, schools, and so on, is broken or a valve 35 is required to be replaced.

A path of system water is composed of pipes 30 and a valve 35 in FIG. 2. In case of valve breakdown, system water in the valve part is frozen by applying the pipe freezing system 100 to the pipes 30 of both sides of the valve 35. Accordingly, the system water may not flow through the valve 35 to make it easy to replace the valve 35.

Figure 3:
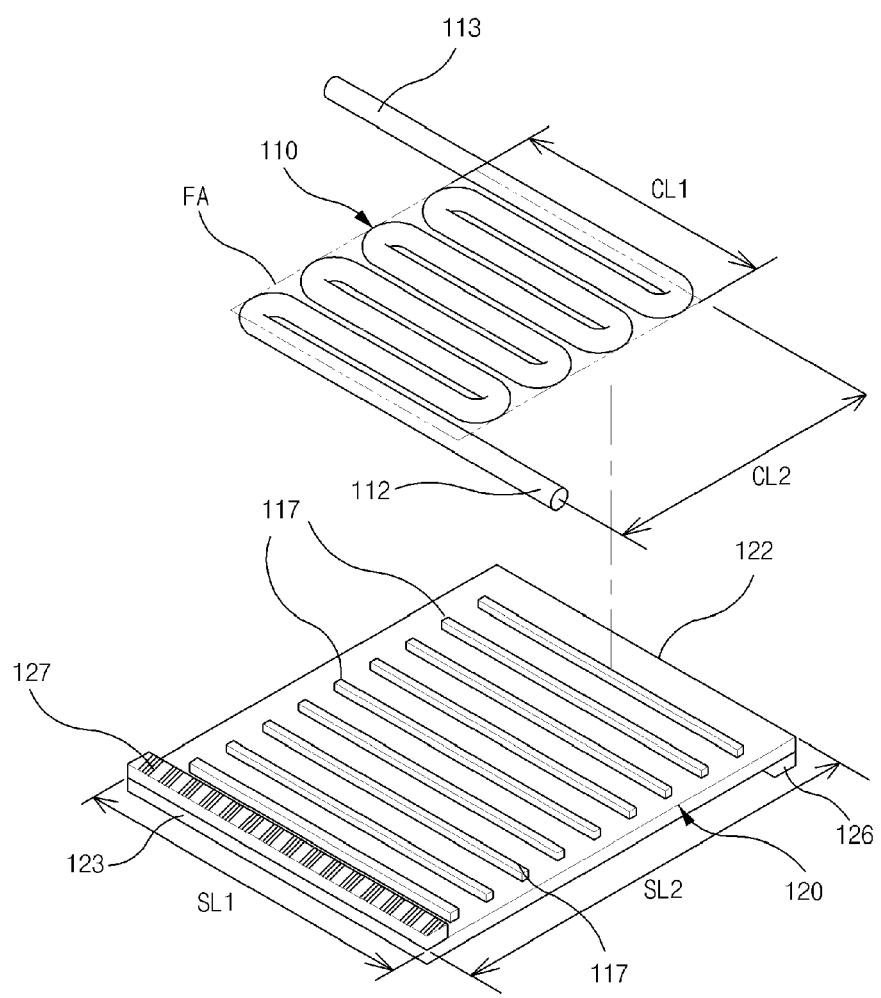
FIGS. 3 through 5 are diagrams illustrating a process for performing the rapid freezing method according to an exemplary embodiment of the present inventive concept in order.
Figure 4:
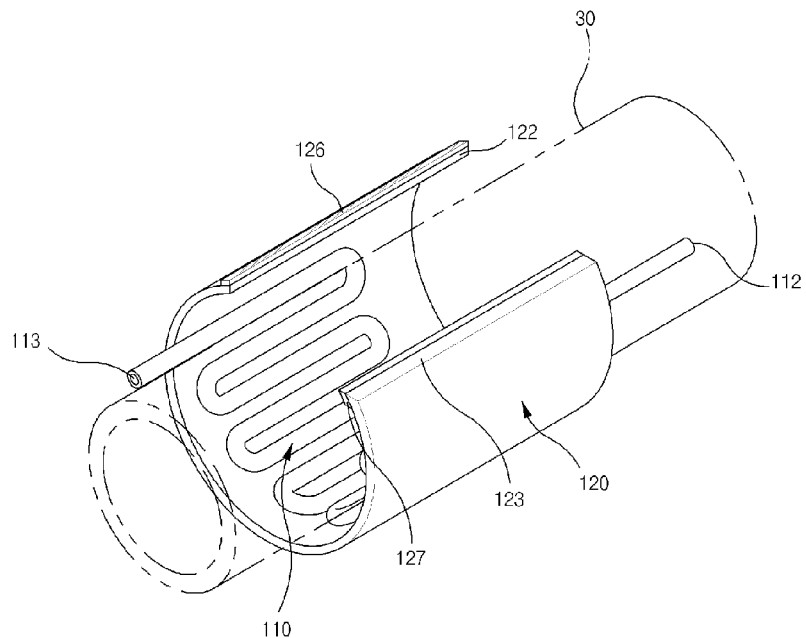
Figure 5:
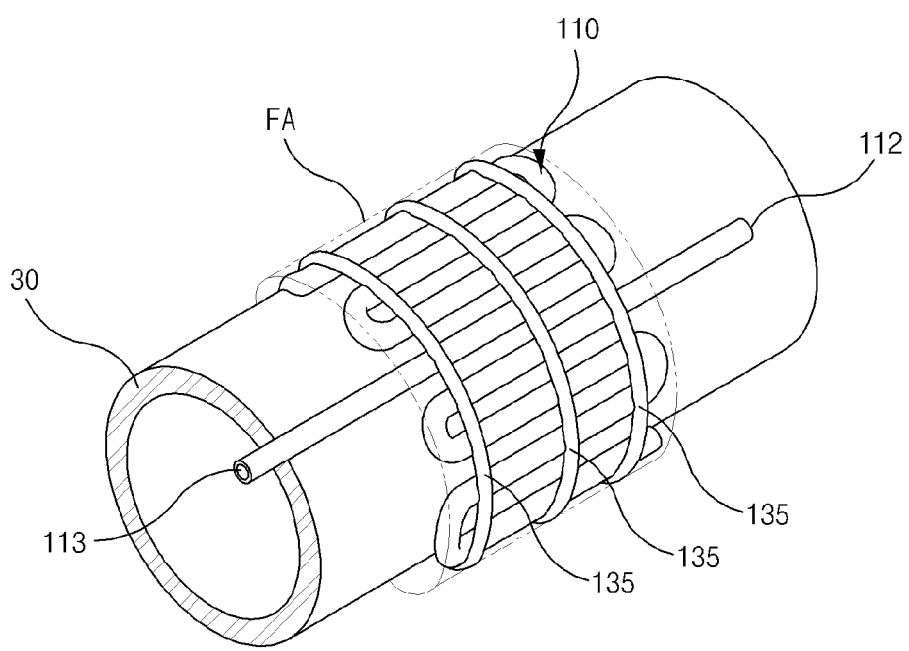

The method of rapid pipe freezing method is installing the pipe freezing system 100 on the pipe 30 and operating the system. The method includes arranging a cooling coil, fixing the cooling coil, installing a cover sheet, removing the cover sheet, installing coil fixing unit, and refrigerant flowing. FIGS. 3 through 5 show the process of the rapid pipe freezing method in order.

Referring to FIG. 3, the arranging a cooling coil is bending the cooling coil 110 to be arranged and forming a freezing area (FA) with the cooling coil 110. The cooling coil 110 is a metal tube and generally made of copper Cu. The copper tube has excellent thermal efficiency and bended easily to be processed in the field. But, the cooling coil 110 may be made of alloy or other metal material.

The one end of the cooling coil 110 is an entrance for refrigerant 112, the other end is a discharge unit for the refrigerant 113, and the cooling coil 110 is bended along a zigzag path to form the freezing area FA between the entrance for refrigerant 110 and the discharge unit for the refrigerant 112. The freezing area FA is defined by the distance CL1 of a straight coil between bended corners of zigzag and a distance CL2 between the entrance for refrigerant 112 and the discharge unit for refrigerant 113. The area of the freezing area FA is CL1*CL2. The cooling coil 110 is required to be bended gradually such that the path inside of the cooling coil 110 may not be blocked, and the cooling coil 110 may be blocked if it is bended sharply. Meanwhile, a method of bending the cooling coil 110 is not restricted to the zigzag way, and moreover, the definition of the freezing area FA may be varied according to the method of bending the cooling coil 110.

The fixing the cooling coil includes preparing a cover sheet 120, arranging the cooling coil 110 on one surface of the cover sheet 120 to contact the cover sheet 120 and fixing the same thereto. The cover sheet 120 needs to be flexible to be bended easily, strong enough not to be tear easily, and attachable to the cooling coil 110. For example, urethane material is available. But the embodiment is not restricted to the urethane sheet.

The width SL1 of the cover sheet 120 is preferred to be larger than the width CL1 of the freezing area FA and the length SL2 of the cover sheet 120 is preferred to be longer than the length CL2 of the freezing area FA for the next operation of installing cover sheet. The cover sheet 120 and the cooling coil 110 may adhere with each other by double-faced adhesive tape 117. The double-faced adhesive tape 117 may be arranged in a direction of the width SL1 of the cover sheet 120 in a length and in a direction of the length SL2 of the cover sheet 120 in a width separately, or reversely, in a direction of the width SL1 of the cover sheet 120 in a width and in a direction of the length SL2 of the cover sheet 120 in a length. But the cooling coil 110 may be adhered to the cover sheet 120 by other method such as spreading adhesion.

Meanwhile, the entrance for refrigerant 112 and the discharge unit for refrigerant 113 of the cooling coil 110 are preferred to be arranged not to face the one end of the cover sheet 122 and the other end of the cover sheet 123, and to be exposed to the outside in the installing a cover sheet.

Referring to FIG. 4, the installing a cover sheet is wrapping the outer circumference surface of the pipe 30 with the cover sheet 120 so as the cooling coil 100 to face the outer circumference surface of the pipe 30. At this time, the one end of the cover sheet 122 and the other end of the cover sheet 123 are pulled tightly and connected with each other such that the cooling coil 110 may be pressed to the outer circumference surface. The one end of the cover sheet 122 includes a male Velcro pad 126 (referred to FIG. 3) and the other end of the cover sheet 123 includes a female Velcro pad 127 (referred to FIG. 3) such that the one end 122 and the other end 123 may be attached and detached. But the embodiment for connecting the one end 122 and the other end 123 is not restricted to the Velcro fastener, and other methods such as snap fastener may be available. As a result, the cooling coil 110 may be enclosed around the outer circumference surface of the pipe 30 with just wrapping the cover sheet 120 around the pipe 30, which is faster and easier than conventional winding of the cooling coil 110.

The removing the cover sheet 120 is removing the cover sheet 120 from the cooling coil 110 still attached to the pipe 30. The male Velcro pad 123 and the female Velcro pad 127 are detached with each other, and the cover sheet 120 may be taken off from the cooling coil 110 with stronger power than the adhesive power of the both-sided adhesive tape 117. The cooling coil 110 is already plastically processed, thus, it will keep its status of enclosing the outer circumference surface of the pipe 30 even if the cover sheet 120 is removed therefrom.

At this time, the cooling coil 110 of the freezing area FA enclosing the outer circumference surface of the pipe 30 includes a plurality of straight unit extended in parallel with the length direction of the pipe 30 and a curve unit bended so as to form zigzags in the terminals of the plural straight unit. The straight unit may not bended and only the curve unit may be bended when the cooling coil 110 is arranged along the curved surface of the outer circumference of the pipe 30 by the cover sheet 120, accordingly, strong power may not be required and operating time may be shortened.

Referring to FIG. 5, the installing a coil fixing unit is fixing the cooling coil 110 of the freezing area FA with a coil fixing unit 135. At least one of the coil fixing units 135 is wound around the cooling coil 110 such that the cooling coil 110 may be pressed to the outer circumference surface of the pipe 30. For example, the coil fixing unit 135 may be a string made of fabric or synthetic resin, or metal wire. Or the coil fixing unit 135 may be a detachable strip with a male Velcro pad and a female Velcro pad on both ends respectively.

Referring to FIG. 2 again, the flowing refrigerant is connecting a refrigerant cooling device 105 to the cooling coil 110 and freezing the inside of the pipe 30 overlapped with the freezing area FA (referred to FIG. 5) by flowing refrigerant through the inside of the cooling coil 110. For example, liquid nitrogen, Freon gas, and the like, are used as a refrigerant. Specifically, a refrigerant supply connecting tube 106 in the refrigerant cooling device 105 is connected to the entrance for refrigerant 112 through a connection 106a, and a refrigerant collection connecting tube 107 is connected to the discharge unit for a refrigerant 113 through a connection 107a to connect the refrigerant cooling device 105 to the cooling coil 110. And then, once the refrigerant cooling device 105 is operated, the refrigerant circulates a heat exchange path of the refrigerant cooling device 105 and the cooling coil 110. For example, when liquid nitrogen is used as a refrigerant, the liquid refrigerant discharged from the refrigerant cooling device 105 enters the freezing area FA and evaporated after absorbing around heat. And the evaporated refrigerant is collected to the refrigerant cooling device 105 and devolatilizes after releasing heat. The inside of the pipe 30 is frozen during the process of refrigerant circulation between the refrigerant cooling device 105 and the cooling coil 110.

Meanwhile, in case of pipe 30 with large diameter, the operator may wrap the outer circumference surface of the pipe 30 by connecting a plurality of cover sheets 120. The plurality of cover sheet 120 may be connected with Velcro fastener on their ends 123. At this time, each cooling coil 110 attached to each cover sheet 120 wrapping the pipe 30 is connected to the separate refrigerant cooling device 105 in the refrigerant flowing stage. Accordingly, the plurality of refrigerant cooling devices 105 are used for the pipe 30 with large diameter, enabling fast freezing of the inside of the pipe 30.

While the present invention has been particularly shown and described with reference to exemplary embodiments thereof, it will be understood that various changes in form and details may be made therein without departing from the spirit and scope of the following claims.

INDUSTRIAL USABILITY

The present invention is applicable to maintenance of pipes in water supply, gray water, sewerage, power plant, or so, such as fixing or replacing.

What is claimed is:
1. A rapid pipe freezing method comprises:
bending a cooling coil not to be blocked by itself so that a refrigerant flow through the inside thereof and arranging the cooling coil to form a freezing area FA;
fixing the cooling coil to be arranged on the one side of the cover sheet such that at least one part of the freezing area may be overlapped with the cover sheet;
installing the cover sheet wrapping the outer circumference surface of the pipe with the cover sheet such that the cooling coil of the freezing area face the outer circumference surface of the pipe;
refrigerant freezing by connecting a refrigerant cooling device to one side of the cooling coil and the other side of the cooling coil and flowing the refrigerant through the inside of the cooling coil to freeze the inside of the pipe where the freezing area is overlapped, and
wherein the method further includes removing the cover sheet by taking off the cover sheet from the cooling coil still attached to the outer circumference surface and installing a coil fixing unit by winding the cooling coil of the freezing area with a coil fixing unit to press the cooling coil toward the pipe and fix the cooling coil between the installing a cover sheet and the flowing a refrigerant.

2. The rapid pipe freezing method of claim 1, wherein the one end of the cover sheet and the other end thereof are connected such that the cooling coil may be pressed to the outer circumference surface of the pipe.

3. The rapid pipe freezing method of claim 1, wherein the one end of the cover sheet and the other end thereof are attached and detached with each other by a male Velcro pad and a female Velcro pad prepared on each end.

4. The rapid pipe freezing method of claim 1, wherein the coil fixing unit is a string or a metal wire.

5. The rapid pipe freezing method of claim 1, wherein the fixing the cooling coil includes attaching the cover sheet and the cooling coil with both-sided adhesive tape.

* * * * *